(12) United States Patent
Lambert

(10) Patent No.: US 10,711,515 B2
(45) Date of Patent: Jul. 14, 2020

(54) COCKPIT CANOPY CUTTING GAS GENERATOR

(71) Applicant: Goodrich Corporation, Charlotte, NC (US)

(72) Inventor: Jerry A. Lambert, Dixon, CA (US)

(73) Assignee: Goodrich Corporation, Charlotte, NC (US)

( * ) Notice: Subject to any disclaimer, the term of this patent is extended or adjusted under 35 U.S.C. 154(b) by 232 days.

(21) Appl. No.: 16/002,861

(22) Filed: Jun. 7, 2018

(65) Prior Publication Data
US 2019/0376336 A1    Dec. 12, 2019

(51) Int. Cl.
*E06B 7/00* (2006.01)
*E06B 5/00* (2006.01)
*B64C 1/32* (2006.01)

(52) U.S. Cl.
CPC .................. *E06B 7/00* (2013.01); *E06B 5/00* (2013.01); *B64C 1/32* (2013.01)

(58) Field of Classification Search
CPC ................ E06B 7/00; E06B 5/00; B64C 1/32
USPC .......................... 89/1.14; 244/122 AF, 137.1
See application file for complete search history.

(56) References Cited

U.S. PATENT DOCUMENTS

| | | | |
|---|---|---|---|
| 3,724,372 A * | 4/1973 | Phillips | F42B 33/06 |
| | | | 102/364 |
| 4,301,707 A * | 11/1981 | Schimmel | B26F 3/04 |
| | | | 244/122 AF |
| 4,407,468 A | 10/1983 | Bement et al. | |
| 4,512,538 A | 4/1985 | Devienne | |
| 4,721,272 A | 1/1988 | Nordhaus | |
| 8,397,431 B2 | 3/2013 | Krahl | |
| 2011/0167994 A1* | 7/2011 | Au-Yeung | B64C 1/1492 |
| | | | 89/1.14 |

* cited by examiner

*Primary Examiner* — Samir Abdosh
(74) *Attorney, Agent, or Firm* — Snell & Wilmer L.L.P.

(57) ABSTRACT

A pyrotechnic egress system may comprise a case defining an opening, a gas generator disposed within the case, the gas generator configured to generate a gas flame in response to being ignited, and an ignition line disposed at the opening and configured to ignite the gas generator, wherein the case directs the gas flame through the opening for deflagrating a window.

20 Claims, 4 Drawing Sheets

COCKPIT CANOPY CUTTING GAS GENERATOR

FIELD

The present disclosure relates to a pyrotechnic egress system, and more particularly to systems which facilitate emergency egress from air or water vehicles.

BACKGROUND

Pyrotechnic egress systems explosively sever materials such as aircraft canopy transparencies, egress panels, and other structural members. Operation of this type of system may communicate at least some energy inwards toward the crew in the form of a pressure wave. Furthermore, in aircraft which operate in a maritime environment, the pressure wave may be magnified in an underwater egress situation.

SUMMARY

A pyrotechnic egress system is disclosed, comprising a case defining an opening, a gas generator disposed within the case, the gas generator configured to generate a gas flame in response to being ignited, and an ignition line disposed at the opening and configured to ignite the gas generator, wherein the case directs the gas flame through the opening for deflagrating a window.

In various embodiments, the gas generator comprises a pyrotechnic composite.

In various embodiments, the case is filled with the gas generator.

In various embodiments, the case is tapered towards the opening.

In various embodiments, the case is manufactured of a metal.

In various embodiments, the ignition line comprises a braided cord disposed in a tube having a vent facing the gas generator.

In various embodiments, the ignition line comprises an electrically conductive wire heated by electrical current.

In various embodiments, the case comprises an outer case and an inner case, the opening defined between the outer case and the inner case.

An emergency egress structure is disclosed, comprising a window and a pyrotechnic egress system coupled to the window, the pyrotechnic egress system comprising a case defining an opening, a gas generator disposed within the case, wherein the gas generator is configured to generate a gas flame in response to being ignited, and an ignition line disposed at the opening and configured to ignite the gas generator, wherein the case directs the gas flame through the opening for deflagrating the window.

In various embodiments, the window is separated into at least two separate pieces in response to the gas flame deflagrating the window.

In various embodiments, the case is filled with the gas generator.

In various embodiments, the window is manufactured of an acrylic.

In various embodiments, the gas generator comprises a pyrotechnic composite.

In various embodiments, the pyrotechnic egress system extends around a periphery of the window.

In various embodiments, the case comprises an outer case and an inner case, the inner case coupled to the window.

In various embodiments, the opening is defined between the outer case and the inner case.

A method of manufacturing a pyrotechnic egress system is disclosed, comprising disposing a gas generator into an outer case, positioning an inner case with respect to the outer case to define an opening, and disposing an ignition line at the opening.

In various embodiments, the method further comprises curing the gas generator in the outer case.

In various embodiments, the ignition line is disposed at the opening before the gas generator is fully cured.

In various embodiments, the method further comprises bonding the ignition line to the gas generator.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments, a pyrotechnic egress system, as disclosed herein, may be used for forming an egress in a window during an emergency event. The pyrotechnic egress system may use deflagration to cut through the window. Unlike the supersonic pressure waves produced by detonation, deflagration produces subsonic pressure waves. In this regard, the pyrotechnic egress system as disclosed herein may be capable of use under water without producing supersonic pressure waves. The pyrotechnic egress system as disclosed herein may be capable of use both underwater and in the air.

Figure 1:
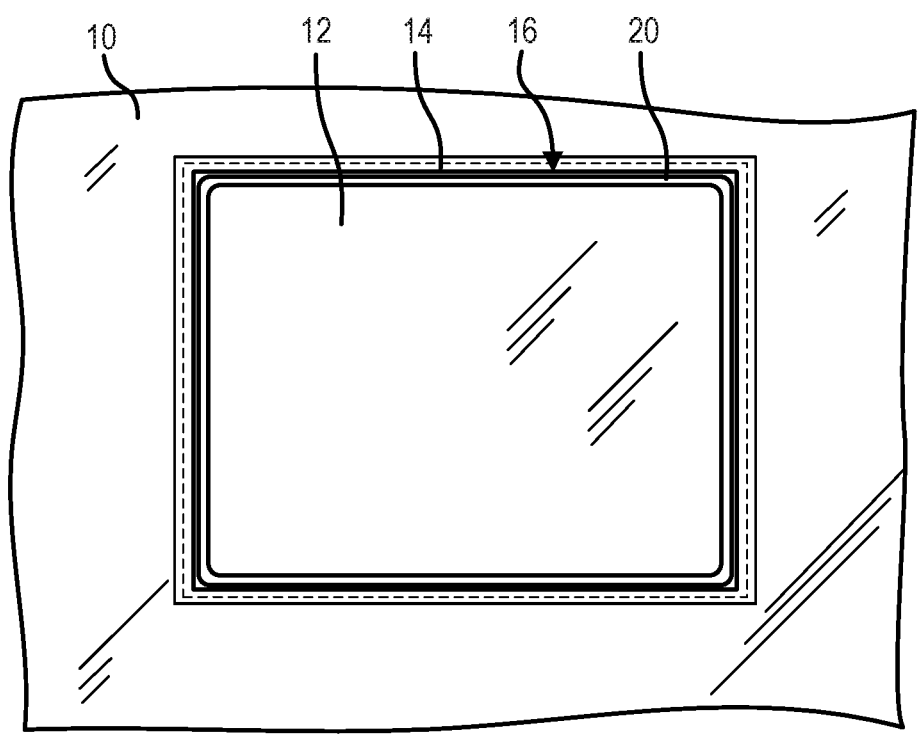
FIG. 1 is a plan view of an interior of a vehicle frame including a window and a pyrotechnic egress system disposed along the periphery of the window, in accordance with various embodiments.

FIG. 1 is an interior plan view of a vehicle frame 10, in accordance with various embodiments. The vehicle frame 10 may be fabricated from a metal material, carbon composite material, or any other suitable material for land vehicles, air vehicles, or water vehicles. The vehicle frame 10 includes a window 12 supported by a window frame 14. In various embodiments, window 12 is an acrylic window, e.g., a product marketed under the trademark PLEXIGLAS® by Rohm and Haas Co. of Philadelphia, Pa. In this regard, window 12 may be an acrylic window, in accordance with various embodiments. In various embodiments, window 12 is between 3.175 mm (0.125 in) and 25.4 mm (1.0 in) thick, and in various embodiments, window 12 is between 3.175 mm (0.125 in) and 12.7 mm (0.5 in) thick, and in various embodiments, window 12 is between 6.35 mm (0.25 in) and 9.525 mm (0.375 in) thick. However, a pyrotechnic egress system, as disclosed herein may be suitable for any thickness of window.

A pyrotechnic egress system 20 may extend around a periphery 16 of window 12. An egress area may be defined by periphery 16. Pyrotechnic egress system 20 may be activated during an emergency event to allow for rapid egress from within vehicle frame 10. In response to being activated, pyrotechnic egress system 20 may cut through window 12 via deflagration allowing the portion of window 12 that is circumscribed by pyrotechnic egress system 20 to be detached from vehicle frame 10. Pyrotechnic egress system 20 and window 12 may be collectively referred to herein as an emergency egress structure.

Figure 2A:
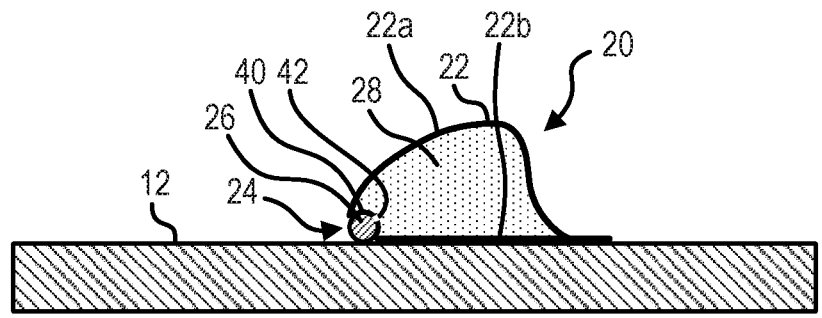
FIG. 2A, FIG. 2B, and FIG. 2C are cross-section views of a pyrotechnic egress system installed onto a window before, during, and towards the end of being activated, in accordance with various embodiments.

With reference to FIG. 2A, a cross section view of pyrotechnic egress system 20 installed onto window 12 is illustrated, in accordance with various embodiments. Pyrotechnic egress system 20 may comprise a case 22 defining an opening 24. Pyrotechnic egress system 20 may comprise a gas generator 28 disposed within case 22. Gas generator 28 may at least partially fill case 22. Stated differently, gas generator 28 may be placed into case 22 such that the case 22 is completely or almost completely full with gas generator 28. Gas generator 28 may comprise a pyrotechnic composite comprising a fuel and an oxidizer, such as, for example, ammonium perchlorate (oxidizer) and aluminum powder (fuel), among others. Gas generator 28 may be comprised of a formulation that provides high oxygen content in the gas produced to increase the burning of the window material (e.g., acrylic). In this regard, gas generator 28 may generate an oxidizing gas flame. Gas generator 28 may be capable of burning at atmospheric pressure. In various embodiments, gas generator 28 may comprise an ammonium based pyrotechnic, a calcium based pyrotechnic, potassium based pyrotechnic, or any other suitable pyrotechnic for generating an oxygenated gas flame. Gas generator 28 may comprise a formulation of: 80-95% oxidizer (e.g., ammonium perchlorate, potassium perchlorate, etc.), 0-2% metal powder (e.g., aluminum), 0-2% burning rate modifier (e.g., iron oxide), 4-20% binder polymer (e.g., polyethylene glycol, polypropylene glycol, etc.), and 0-4% curative (e.g., isocyanate curative), in accordance with various embodiments. One example formulation is: 90% ammonium perchlorate, 1% aluminum powder, 1.50% iron oxide, 5% polypropylene glycol, and 2.50% isocyanate curative. Gas generator 28 may further contain a scavenger, such as potassium nitrate, that will convert hydrogen chloride exhaust products to less harmful products.

Figure 3:
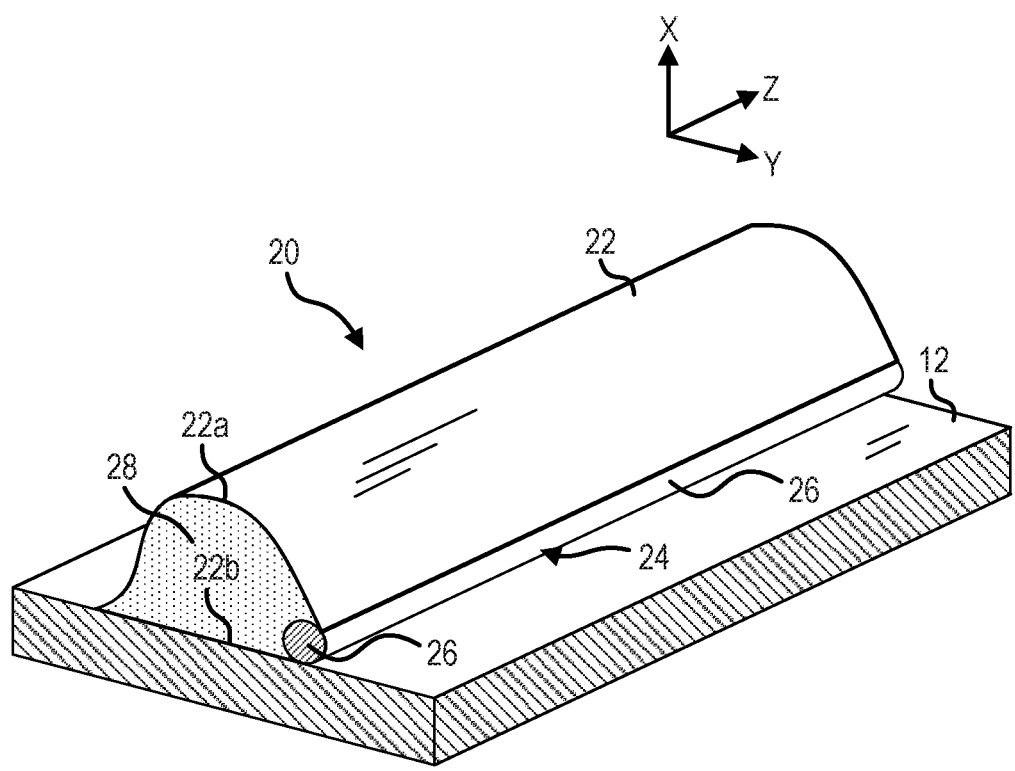
FIG. 3 is an isometric view of the pyrotechnic egress system installed onto a window before being activated, in accordance with various embodiments.

With combined reference to FIG. 2A and FIG. 3, pyrotechnic egress system 20 may comprise an ignition line 26. Ignition line 26 may be disposed at opening 24. In various embodiments, ignition line 26 may plug opening 24. Stated differently, case 22 and ignition line 26 may enclose gas generator 28 such that gas generator 28 is not exposed. Ignition line 26 may extend along the length (Z-direction of FIG. 3) of pyrotechnic egress system 20. In various embodiments, ignition line 26 is a pressurized fuse. In various embodiments, ignition line 26 may burn at a rate of approximately 508 mm (20 in) per second along the length (Z-direction of FIG. 3) of ignition line 26. Ignition line 26 may be activated in response to an emergency event. Ignition line 26 may comprise a pyrotechnic composite. Ignition line 26 may be configured to ignite gas generator 28. In this regard, ignition line 26 may heat gas generator 28 to its ignition point, causing gas generator 28 to ignite. In response to being ignited, the hot gases generated by gas generator 28 may combust ignition line 26 and/or may eject ignition line 26 from opening 24.

In various embodiments, ignition line 26 may comprise a braided cord coated with a combination of black powder and/or boron-potassium nitrate, encased in a tube 40 made of a combustible material (such as cellulose nitrate), with a vent 42 on the side facing the gas generator 28, in which the casing material pressurizes the braided cord so that it burns rapidly, even under water, and directs its flames principally into the gas generator 28.

In various embodiments, ignition line 26 may comprise a resistive igniter line comprising an electrically conductive wire heated by electrical current.

Figure 2B:
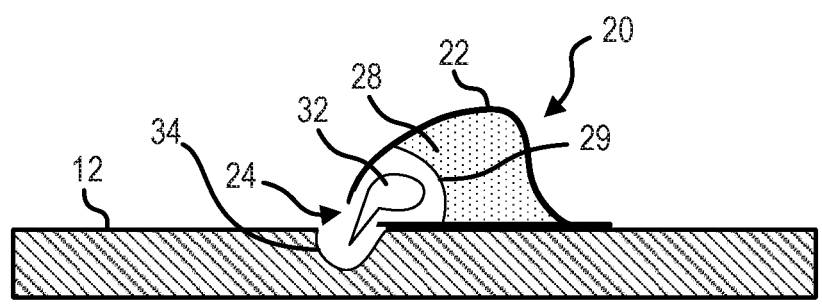

With reference to FIG. 2B, a cross section view of pyrotechnic egress system 20 in an activated state is illustrated, in accordance with various embodiments. Once ignited, gas generator 28 may generate a gas flame 32. Case 22 may route the gas flame 32 out through opening 24. The gas flame 32 may contact window 12 whereby the gas flame heats the window 12 causing it to burn away via deflagration. The gas flame may initially burn a trench 34 into window 12.

Figure 2C:
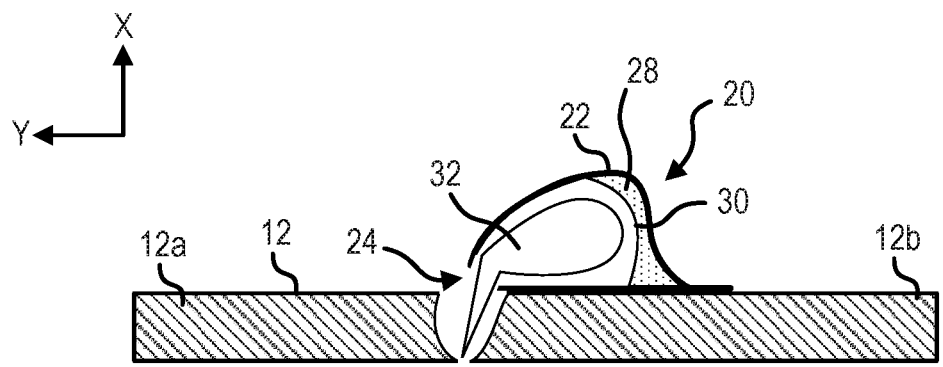

With reference to FIG. 2C, a cross section view of pyrotechnic egress system 20 in an activated state is illustrated, in accordance with various embodiments. Gas flame 32 may continue to deflagrate window 12 until window 12 is separated into two separate pieces 12a, 12b. Upon separation, an aperture may be formed in the window 12 whereby a pilot and/or passenger may egress from vehicle frame 10, with momentary reference to FIG. 1.

As illustrated in FIG. 2B and FIG. 2C, as gas generator 28 burns, starting from opening 24 and working towards the opposite end of case 22 from opening 24, the exposed burning surface 29, 30 may grow. Stated differently, exposed burning surface 29 may comprise a smaller surface area than exposed burning surface 30. In this regard, the gas flame 32 may progressively grow as gas generator 28 burns due to the increased burning area (i.e., exposed burning surface 29 and exposed burning surface 30) of gas generator 28. In this manner, the gas flame 32 may reach deeper (negative X-direction in FIG. 2C), due to increased mass flow, into window 12 as trench 34 becomes deeper. In this regard, case 22 may be tapered towards opening 24.

With reference again to FIG. 2A and FIG. 3, case 22 may be made of steel or other rigid material capable of withstanding the heat and pressure generated by gas generator 28 during ignition while tending to resist eroding, softening and/or flexing in a manner that would prevent the gas flame 32 from being directed into window 12. In various embodiments, case 22 may be coated with a liner or inhibitor to prevent the spread of the gas flame 32 between gas generator 28 and case 22. Case 22 may comprise an outer case 22a and an inner case 22b. Inner case 22b may be configured to hold pyrotechnic egress system 20 against the window 12. Inner case 22b may be bonded to window 12. Inner case 22b may be configured to inhibit the surface of the gas generator 28 to prevent the spread of the flame into the area between the gas generator 28 and the case 22 or the window 12. Inner case 22b may be composed of metal, metal lined with a plastic inhibitor, or plastic. Opening 24 may be defined between outer case 22a and inner case 22b.

Figure 4:
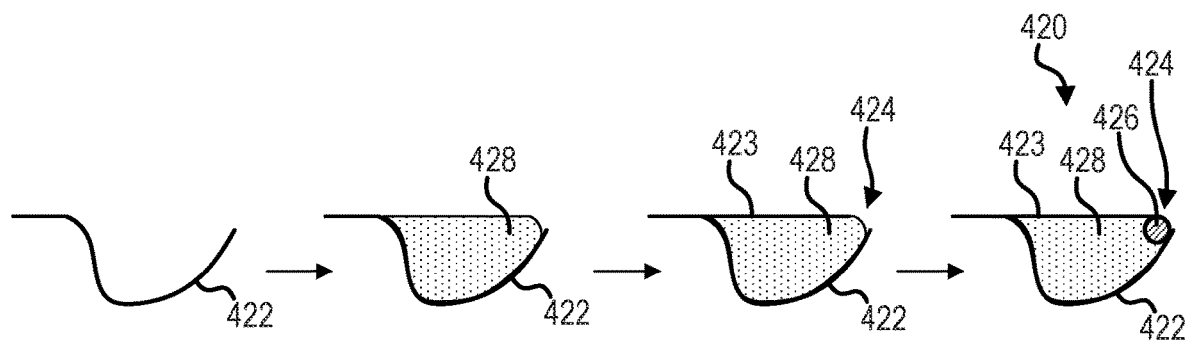
FIG. 4 illustrates steps for manufacturing a pyrotechnic egress system, in accordance with various embodiments.
Figure 5:
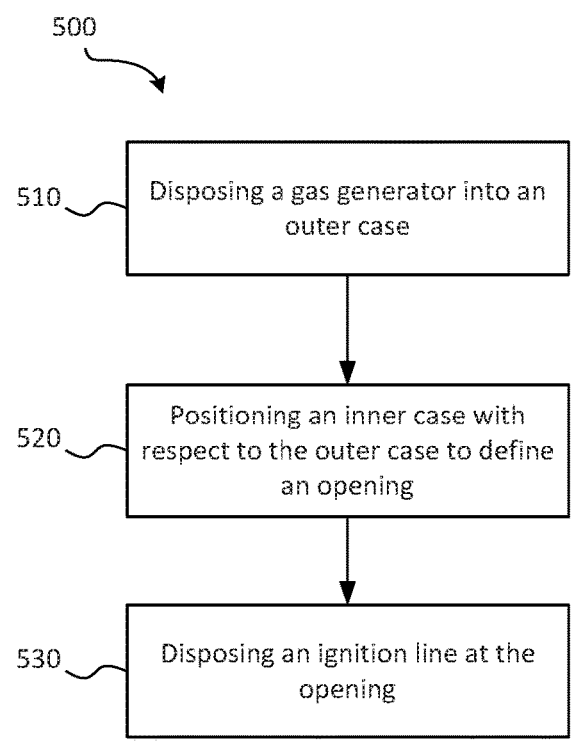
FIG. 5 is a flow chart of a method for manufacturing a pyrotechnic egress system, in accordance with various embodiments.

With combined reference to FIG. 4 and FIG. 5, a method 500 for manufacturing a pyrotechnic egress system 420 is illustrated, in accordance with various embodiments. Method 500 includes disposing a gas generator 428 into an outer case 422 (step 510). In various embodiments, gas generator 428 may be pressed into outer case 422. In various embodiments, gas generator 428 may be poured into outer case 422 wherein the gas generator 428 may cure and harden. Method 500 includes positioning an inner case 423 with respect to the outer case 422 to define an opening 424 (step 520). In various embodiments, inner case 423 may be coupled to outer case 422. In various embodiments, inner case 423 may be bonded to outer case 422. Method 500 includes disposing an ignition line 426 at the opening 424 (step 530). In various embodiments, ignition line 426 may be pressed onto gas generator 428 before gas generator 428 has fully cured. In various embodiments, ignition line 426 may be bonded to gas generator 428.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A pyrotechnic egress system, comprising:
   a case defining an opening;
   a gas generator disposed within the case, the gas generator configured to generate a gas flame in response to being ignited; and
   an ignition line disposed at the opening and configured to ignite the gas generator;
   wherein the case directs the gas flame through the opening for deflagrating a window.

2. The pyrotechnic egress system of claim 1, wherein the gas generator comprises a pyrotechnic composite.

3. The pyrotechnic egress system of claim 2, wherein the case is filled with the gas generator.

4. The pyrotechnic egress system of claim 2, wherein the case is tapered towards the opening.

5. The pyrotechnic egress system of claim 2, wherein the case is manufactured of a metal.

6. The pyrotechnic egress system of claim 2, wherein the ignition line comprises a braided cord disposed in a tube having a vent facing the gas generator.

7. The pyrotechnic egress system of claim 2, wherein the ignition line comprises an electrically conductive wire heated by electrical current.

8. The pyrotechnic egress system of claim 2, wherein the case comprises an outer case and an inner case, the opening defined between the outer case and the inner case.

9. An emergency egress structure, comprising:
   a window; and
   a pyrotechnic egress system coupled to the window, the pyrotechnic egress system comprising:
      a case defining an opening;
      a gas generator disposed within the case, wherein the gas generator is configured to generate a gas flame in response to being ignited; and an ignition line disposed at the opening and configured to ignite the gas generator;

wherein the case directs the gas flame through the opening for deflagrating the window.

10. The emergency egress structure of claim 9, wherein the window is separated into at least two separate pieces in response to the gas flame deflagrating the window.

11. The emergency egress structure of claim 10, wherein the case is filled with the gas generator.

12. The emergency egress structure of claim 11, wherein the window is manufactured of an acrylic.

13. The emergency egress structure of claim 12, wherein the gas generator comprises a pyrotechnic composite.

14. The emergency egress structure of claim 13, wherein the pyrotechnic egress system extends around a periphery of the window.

15. The emergency egress structure of claim 13, wherein the case comprises an outer case and an inner case, the inner case coupled to the window.

16. The emergency egress structure of claim 15, wherein the opening is defined between the outer case and the inner case.

17. A method of manufacturing a pyrotechnic egress system, comprising:

disposing a gas generator into an outer case;

positioning an inner case with respect to the outer case to define an opening; and disposing an ignition line at the opening.

18. The method of claim 17, further comprising curing the gas generator in the outer case.

19. The method of claim 18, wherein the ignition line is disposed at the opening before the gas generator is fully cured.

20. The method of claim 17, further comprising bonding the ignition line to the gas generator.

* * * * *